United States Patent
Matsui

(10) Patent No.: US 7,464,939 B2
(45) Date of Patent: Dec. 16, 2008

(54) SEALING DEVICE WITH ROTATION DETECTING ELEMENT

(75) Inventor: Hiroki Matsui, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/593,092

(22) PCT Filed: Mar. 22, 2005

(86) PCT No.: PCT/JP2005/005083

§ 371 (c)(1),
(2), (4) Date: Sep. 15, 2006

(87) PCT Pub. No.: WO2005/090839

PCT Pub. Date: Sep. 29, 2005

(65) Prior Publication Data

US 2007/0187901 A1    Aug. 16, 2007

(30) Foreign Application Priority Data

Mar. 23, 2004 (JP) ............................. 2004-084203
Sep. 28, 2004 (JP) ............................. 2004-281181

(51) Int. Cl.
*F16J 15/32* (2006.01)
*F16C 32/00* (2006.01)

(52) U.S. Cl. ........................ 277/317; 277/349; 277/562; 277/571; 277/572; 384/448

(58) Field of Classification Search ................ 277/317, 277/349, 571, 562, 572, 566; 384/448
See application file for complete search history.

(56) References Cited

U.S. PATENT DOCUMENTS

| | | | | |
|---|---|---|---|---|
| 3,682,488 A | * | 8/1972 | Matsushima | 277/551 |
| 4,906,009 A | * | 3/1990 | Saitoh | 277/349 |
| 5,201,528 A | * | 4/1993 | Upper | 277/394 |
| 5,350,181 A | * | 9/1994 | Horve | 277/559 |
| 5,695,289 A | * | 12/1997 | Ouchi et al. | 384/448 |
| 5,975,534 A | * | 11/1999 | Tajima et al. | 277/353 |
| 6,573,705 B1 | * | 6/2003 | Tajima et al. | 324/174 |
| 6,637,754 B1 | | 10/2003 | Ohtsuki et al. | 277/549 |
| 6,918,596 B2 | * | 7/2005 | Ichiman | 277/571 |
| 6,939,050 B2 | * | 9/2005 | Ohtsuki et al. | 384/448 |

(Continued)

FOREIGN PATENT DOCUMENTS

DE    10056175 A1    6/2001

(Continued)

*Primary Examiner*—Alison K Pickard
(74) *Attorney, Agent, or Firm*—Jacobson Holman PLLC

(57) ABSTRACT

A sealing device with a rotation detecting element, capable of detecting rotation even when fluid such as engine oil is an object to be sealed, comprises a stationary side sealing element (seal ring) (12) fixed to the stationary side (3), a rotation side sealing element (slinger) (14) installed on the rotation side (2) and made to be in slidably and hermetically contact with the stationary side sealing element (12), and a to-be-detected disc (15) for rotation detection attached to the rotation side (2) and positioned at the atmosphere side from a sealing and sliding section (S) between the stationary side sealing element (12) and the rotation side sealing element (14), wherein the outer peripheral edge of the to-be-detected disc (15) closely faces in the radial direction the stationary side sealing element (12) side.

5 Claims, 4 Drawing Sheets

U.S. PATENT DOCUMENTS

| | | | |
|---|---|---|---|
| 7,077,574 B2 * | 7/2006 | Niebling et al. | 384/448 |
| 7,140,781 B2 * | 11/2006 | Niebling et al. | 384/448 |
| 2003/0059138 A1 * | 3/2003 | Nantua et al. | 384/448 |
| 2005/0141795 A1 * | 6/2005 | Bochet | 384/448 |
| 2005/0184469 A1 * | 8/2005 | Ishii | 277/562 |

FOREIGN PATENT DOCUMENTS

| | | |
|---|---|---|
| JP | 2001-289254 | 10/2001 |
| JP | 2002-048247 | 2/2002 |
| JP | 2003-166852 | 6/2003 |
| JP | 2003-287142 | 10/2003 |

* cited by examiner

SEALING DEVICE WITH ROTATION DETECTING ELEMENT

This is a nationalization of PCT/JP2005/005083 filed Mar. 22, 2005 and published in Japanese.

BACKGROUND OF THE INVENTION

1. Field of the Invention

The present invention relates to a sealing device for sealing a periphery of a rotary shaft in automobiles, general machines, industrial machines or the like, and the sealing device has a rotation detecting element of a rotary encoder.

2. Description of the Conventional Art

In the automobiles, rotation numbers and rotation speed of an axle, a crank angle of an engine (a rotation angle of a crank shaft) and the like are detected in order to measure travel speed and travel distance and to control ignition and fuel injection timing of an engine. Such the rotation detecting parts need to be sealed so that many trials were made for sealing. For example, it is known that a trial for saving a space for mounting a rotary recorder and a sealing device is made. This trial is indicated in Japanese Patent Application Laid Open No. 2002-48247. In this trial, a magnetized disc, which is a rotation detecting element of a magnetic type rotary encoder, is integrally provided to a sealing element on the rotation side of the sealing device for sealing the periphery of the rotary shaft.

That is, the sealing device indicated in Japanese Patent Application Laid Open No. 2002-48247 includes a seal lip fixed on the shaft hole housing side which is not rotated; and a slinger which is attached to the rotary shaft and contacted slidably and hermetically with the seal lip. The slinger is integrally adhered with the magnetized disc, which is made of a rubber-type elastic material mixed with magnetic powders and has magnetic poles alternate-differently in the circumferential direction. A magnetic sensor is provided on the stationary side so as to closely face the magnetized disc. Therefore, when the magnetized disc is rotated together with the slinger by rotation of the rotary shaft, a pulse signal is outputted from the magnetic sensor closely facing the magnetized disc in correspondence with the magnetic poles alternately passing near the detected face thereof.

However, as for the sealing device indicated in Japanese Patent Application Laid Open No. 2002-48247, a sealing and sliding section having the slinger attached with the magnetized disc and the seal lip slidably contacting with the slinger is to seal the dust on the atmosphere side as a sealing object. Thus, when engine oil is a sealing object, a structural element of the magnetic type rotary encoder is positioned in the engine oil atmosphere. Further, in this case, engine heat transmitted through the engine oil gives adverse effects to a magnetic field of the magnetized disc. Further, when sludge in the engine oil is attached on the surface of the magnetized disc by magnetic force, the sludge gives also adverse effects to the magnetic field of the magnetized disc. In such the cases, there is a problem that signal patterns outputted from the magnetic sensor may be disturbed.

SUMMARY OF THE INVENTION

The present invention is made to solve the above-described problems, and an objective of the present invention is to provide a sealing device with a rotation detecting element capable of detecting rotation even when fluid such as engine oil is an object to be sealed.

In order to effectively solve the above-described technical problems, a sealing device with a rotation detecting element according to the present invention comprises a stationary side sealing element which is fixed to the stationary side and has a seal lip; a rotation side sealing element which is installed on the rotation side and has a seal flange slidably and hermetically contacting with the seal lip so as to seal fluid in an engine; and a to-be-detected disc for rotation detection, which is attached to the rotation side sealing element, is positioned at the atmosphere side from a sealing and sliding section between the seal lip and the seal flange, and is positioned at the inner peripheral side of the stationary side sealing element. An outer peripheral edge of the to-be-detected disc closely faces an inner peripheral surface of the stationary side sealing element in the radial direction.

According to the sealing device with the rotation detecting element according to the present invention, the to-be-detected disc for rotation detection is provided on the atmosphere side from the sealing and sliding section between the stationary side sealing element and the rotation side sealing element. So, the rotation can be detected at the atmosphere side by the sensor even if fluid such as engine oil is an object to be sealed by the sealing device. Further, the to-be-detected disc closely faces the inner peripheral surface of the stationary side sealing element in the radial direction so as to form a labyrinth seal. So, sealing property against foreign materials on the atmosphere side can be enhanced. Further, the to-be-detected disc is positioned on the inner peripheral side of the stationary side sealing element. So, increase of a mounting space in the axial direction of the sealing device by providing the to-be-detected circular disc can be prevented.

DETAILED DESCRIPTION OF PREFERRED EMBODIMENT

Figure 1:
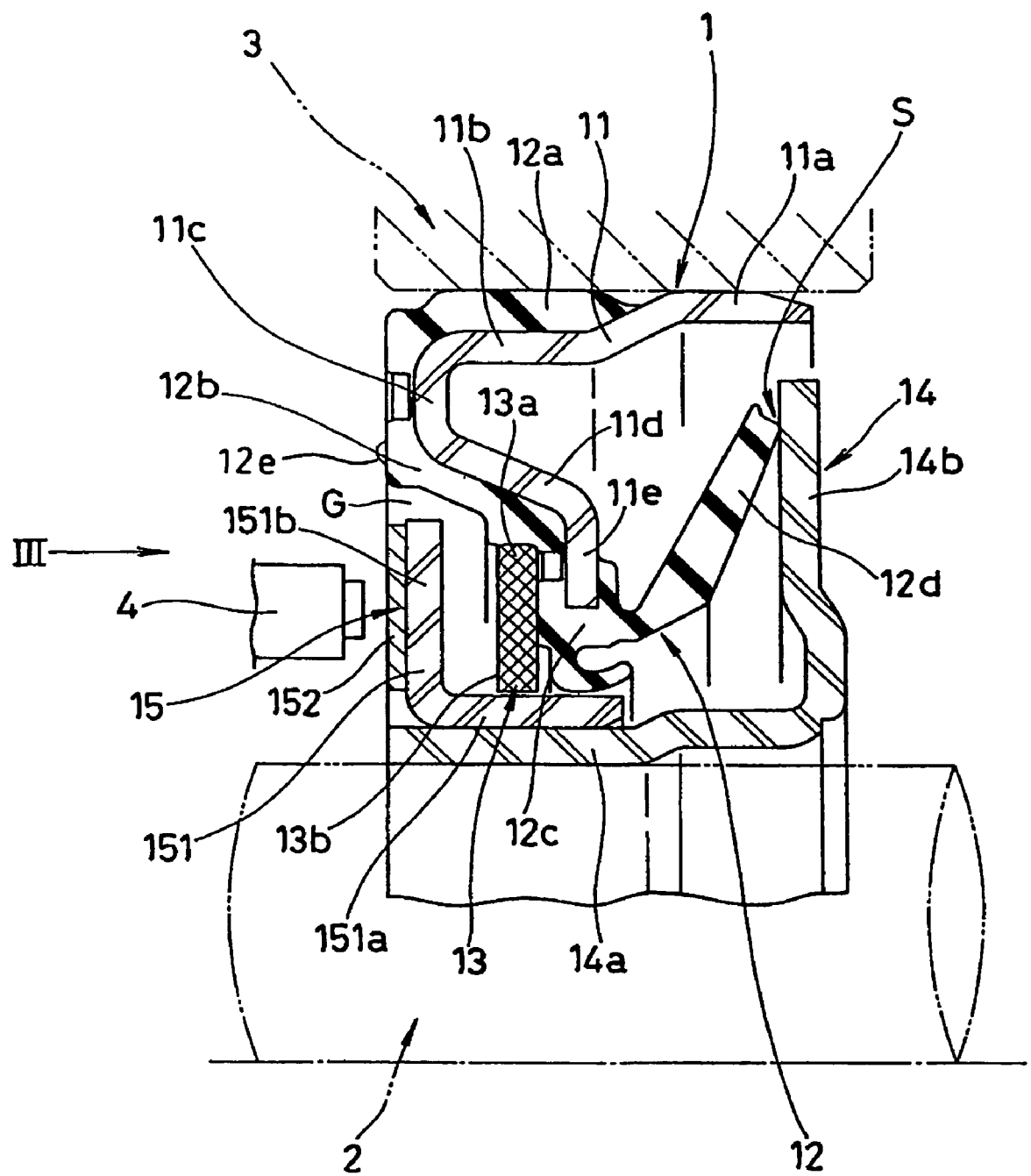
FIG. 1 is a half sectional view in a mounting state illustrating a preferable embodiment of a sealing device with a rotation detecting element according to the present invention, where the device is cut at a plane passing the axis thereof.

Hereinafter, a preferable embodiment of a sealing device with a rotation detecting element according to the present invention is described concretely with drawings. FIG. 1 is a half sectional view in a mounting state illustrating this embodiment, where the device is cut at a plane passing the axis thereof.

In FIG. 1, a reference code 1 is a sealing device, a reference code 2 is a crank shaft of an engine for an automobile, and a reference code 3 is a seal housing, which is attached to a cylinder block (not illustrated) of the engine so as to hold the sealing device 1 on an inner peripheral surface thereof. The crank shaft 2 corresponds to the rotation side in the above description, and the seal housing 3 corresponds to the stationary side in the above description.

Figure 2:
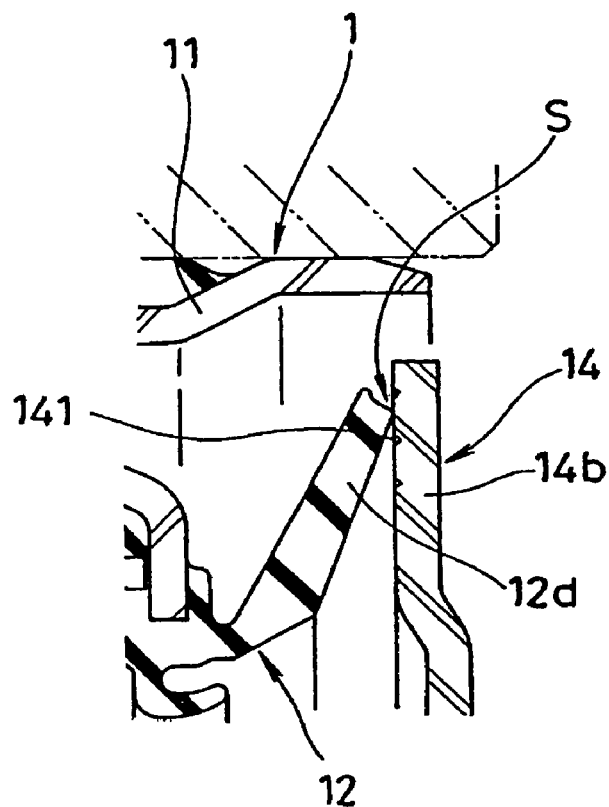
FIG. 2 is a partial sectional view illustrating an example in which a screw is provided at a slinger in the embodiment in FIG. 1.

In addition, in FIGS. 1 and 2, the right side is the inside of the engine, that is, the crank chamber side of the engine in which an engine oil to be sealed exists. Further, the left side is the atmosphere side, that is, the outside space of the engine.

The sealing device 1 has an attachment ring 11 pressed and fitted into an inner peripheral surface of an shaft hole part of the seal housing 3; a seal ring 12 integrally formed with the attachment ring 11; a dust lip 13 attached to an inner peripheral part of the seal ring 12; a slinger 14 mounted on an outer peripheral surface of the crank shaft 2; and a to-be-detected disc 15.

The attachment ring 11 is formed by punching and pressing a metal plate such as a steel plate or the like, and has a cylindrical press-fit part 11a, which is pressed and fitted into the inner peripheral surface of the shaft hole part of the seal housing 3; a cylindrical back up part 11b which is extended to the atmosphere side from the cylindrical press-fit part 11a and formed to have a suitably smaller diameter than that of the cylindrical press-fit part 11a; an outer periphery radial part 11c which is extended to the inner peripheral side from an end part at the atmosphere side thereof; a taper part 11d which is extended to the inside of the engine from the inner periphery thereof; and a inner periphery radial part 11e which is extended to the inner peripheral side from the end part thereof.

The seal ring 12 and the attachment ring 11 correspond to the stationary side sealing element in the above description, and the seal ring 12 is integrally formed (adhered by vulcanizing) with the attachment ring 11 with a rubber-type elastic material. The seal ring 12 has a gasket part 12a, which is positioned and formed at the outer periphery of the cylindrical back up part 11b in the attachment ring 11 and hermetically fitted on an inner periphery surface of the seal housing 3 with a suitable fastening margin; a rubber layer 12b, which is continuously extended toward both side surfaces of the inner periphery radial part 11e through surfaces of the outer periphery radial part 11c and the taper part 11d on the atmosphere side in the attachment ring 11 from the gasket part 12a; a base part 12c at the inner periphery thereof; and a seal lip 12d which is extended to the inside of the engine from a front surface in the inner periphery of the base part 12c and has a taper shaped top end directed to the outer periphery side.

The dust lip 13 is formed with a fabric of a synthetic resin fiber, and an outer periphery part 13a thereof is bonded to a rear surface of the inner periphery part of the base part 12c in the seal ring 12.

The slinger 14 is formed by punching and pressing a metal plate such as a steel plate or the like, and corresponds to the rotation side sealing element in the above description. The slinger 14 includes a cylindrical fitting part 14a tightly fitted to an outer periphery surface of the crank shaft 2; and a seal flange 14b extending from the end part of the engine side thereof so as to have a disc shape. The whole periphery of the top end part of the seal lip 12d in the seal ring 12 hermetically contacts with an inner end surface of the seal flange 14b in the slinger 14, so as to form a sealing and sliding section S. The whole periphery of an inner periphery part 13b in the dust lip 13 closely or adjacently faces an outer peripheral surface of the cylindrical fitting part 14a in the slinger 14.

FIG. 2 is partial sectional view illustrating an example in which a screw 141 is provided at the slinger 14. In particular, when the sealing device 1 is provided at a diesel engine or the like in a motor truck or the like, the grooved or projected screw 141 is formed on an inner end surface of the seal flange 14b of the slinger 14 as illustrated in FIG. 2. The screw 141 is extended in a spiral shape toward the rotating direction of the slinger 14 so as to gradually have a smaller diameter. Therefore, a pump operation for removing fluid toward the outer peripheral side is caused according to the rotation of the slinger 14, so that the sealing property between the seal lip 12d and the seal flange 14b at the sealing and sliding section S can be enhanced.

The to-be-detected disc 15 includes a second slinger 151 and a magnetized rubber disc 152, and is provided on the atmosphere side from the sealing and sliding part S between the seal lip 12d of the seal ring 12, which is the static side seal element, and the seal flange 14b of the slinger 14, which is the rotation side sealing element. The second slinger 151 is formed by punching and pressing a magnetic metal plate such as the steel plate or the like, and includes a cylindrical fitting part 151a and a flange 151b, where the cylindrical fitting part 151a is pressed and fitted into the outer peripheral surface of the cylindrical fitting part 14a in the slinger 14, and the flange 151b is extended from the end part thereof at the atmosphere side to have a disc shape.

An outer peripheral edge of the second slinger 151 in the to-be-detected disc 15 closely faces an inner peripheral face of the rubber layer 12b in the radial direction through a slight gap G, where the rubber layer 12b is adhered on an inner periphery of the taper part 11d in the attachment ring 11. Further, the magnetized rubber disc 152 is obtained by forming a rubber like elastic material to have a disc shape, where the rubber like elastic material is made by uniformly mixing fine powders of a ferromagnetic metal such as a ferrite or the like. The magnetized rubber disc 152 is integrally adhered on an outside surface (surface on the atmosphere side) of the flange 151b in the second slinger 151.

Figure 3:
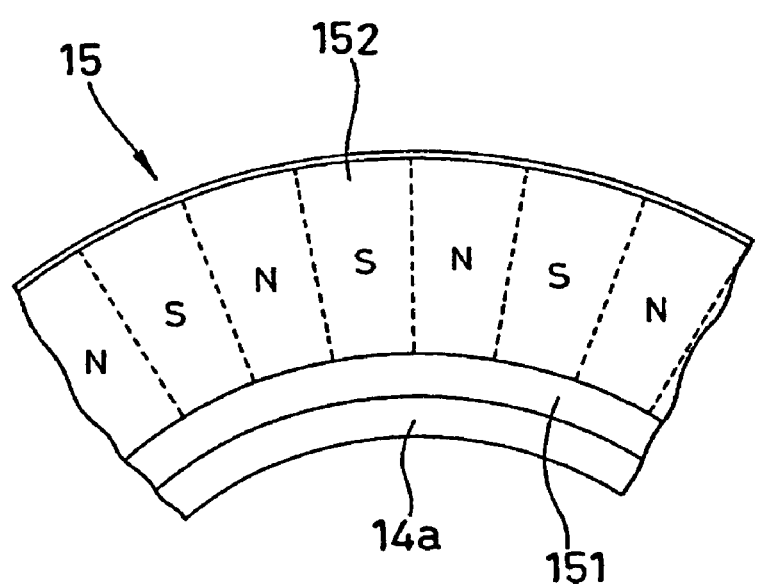
FIG. 3 is a partial view of a to-be-detected disc seen in the direction shown by an arrow III in FIG. 1.

FIG. 3 is a partial view of the to-be-detected circular disc 15 seen in the direction shown by an arrow III in FIG. 1. In particular, the magnetized rubber disc 152 in the to-be-detected disc 15 is provided with different magnetic poles (S poles and N poles) alternately in the circumferential direction.

A magnetic sensor 4 including a magneto resistance element is provided on the atmosphere side of the sealing device 1, and fixed on the seal housing 3 side. A detecting surface of the magnetic sensor 4 closely faces magnetized rubber disc 152 in the to-be-detected disc 15 in the axial direction.

In the sealing device 1 having the above-described constitution, the gasket part 12a of the seal ring 12 is hermetically fitted on the inner peripheral surface of the seal housing 3 with the suitable fastening margin, and the sealing and sliding section S is formed between the seal lip 12d of the seal ring 12 and the seal flange 14b of the slinger 14, in the mounting state as illustrated in FIG. 1. Thereby, leaking of the engine oil in the engine toward the atmosphere side can be prevented. The slinger 14 integrally rotating with the crank shaft 2 has an operation for removing the fluid, which contacts with the seal flange 14b, toward the outer peripheral side by centrifugal force. Thus, the sealing device 1 has an excellent sealing function against the engine oil, which is to pass the sealing and sliding section S to the inner peripheral side.

Further, when the to-be-detected disc 15 integrally rotates with the crank shaft 2, the different magnetic poles (S pole and N pole), which are magnetized to the magnetized rubber disc 152 of the to-be-detected disc 15, alternately pass a front part of the detecting surface of the magnetic sensor 4. Thus, the magnetic sensor 4 generates a pulse signal corresponding to change of magnetic flux crossing it. That is, the to-be-detected disc 15 constitutes a magnetic rotary encoder together with the magnetic sensor 4, and a frequency of the pulse signal outputted from the magnetic sensor 4 is proportional to the rotation numbers of the crank shaft 2. Thus, the rotation speed and rotation angles of the crank shaft 2 can be detected from such pulse trains to use for various controls. Further, when a portion having a different magnetized pattern (a portion having a different magnetized length in the radial direction or magnetized pitch) is provided at one place in the circumferential direction, a rotation angles measuring origin for detecting a specific position, such as a top dead center or the like, can be provided.

Further, according to the above-described constitution, the to-be-detected disc 15 for detecting rotation is positioned at the atmosphere side from the sealing and sliding section S between the seal lip 12*d* of the seal ring 12 and the seal flange 14*b* of the slinger 14. Thus, even though the engine oil is an object to be sealed by the sealing device 1, rotation can be detected by the magnetic sensor 4 at the atmosphere side without being exposed with the engine oil.

On the other hand, the dust lip 13 provided at the inner periphery of the base part 12*c* in the seal ring 12 prevents entering of the foreign materials in the atmosphere side toward the inside of the engine. Further, the flange 151*b* of the second slinger 151 and the magnetized rubber disc 152 in the to-be-detected disc 15 have the operation for removing materials contacting to the disc 15 by centrifugal force. In addition, the outer peripheral edge of the flange 151*b* closely faces the rubber layer 12*b* through the slight gap G, where the rubber layer 12*b* is adhered on the inner periphery of the taper part 11*d* in the attachment ring 11. Thus, the outer peripheral edge of the flange 151*b* has the labyrinth seal effect. Therefore, entering of the foreign materials from the atmosphere side can be effectively prevented.

In the sealing device 1 illustrated in FIG. 1, the to-be-detected disc 15 (the second slinger 151) in the magnetic rotary encoder is provided at an end part directing to the atmosphere side of the cylindrical fitting part 14*a* of the slinger 14, using a space which is kept in the inner periphery side of the attachment ring 11 by the inner periphery radial part 11*e*, the taper part 11*d* and the inner radial direction part 11*c*. Therefore, a mounting space in an axial direction of the sealing device 1 is not increased by providing the to-be-detected disc 15. Further, as described above, the to-be-detected disc 15 (the second slinger 151) itself has the function for preventing the foreign materials from entering from the atmosphere side. So, the sealing property is enhanced.

Further, as for the to-be-detected disc 15, an end surface directing to the atmosphere side is positioned in the axial direction so as to have the same plane as that of an end surface of the rubber layer 12*b* adhered on the outer peripheral radial direction part 11*c* of the attachment ring 11. Therefore, the variation of the distance between the magnetic sensor 4 and the to-be-detected disc 15 is reduced, so that the rotation can be detected accurately.

Further, the seal flange 14*b* of the slinger 14 and the flange 151*b* of the second slinger 151, which are integrated by pressing and fitting in, are provided at both sides in the axial direction of the seal ring 12. Thus, the slinger 14, the second slinger 151, the attachment ring 11, the seal ring 12 and the dust lip 13 can be tentatively assembled, even when these are not mounted on the crank shaft 2 and the seal housing 3. Thus, these parts can be easily kept and handled. Further, if the device is kept in the above-described tentatively assembled state, the sliding part of the seal lip 12*d* of the seal ring 12 and the dust lip 13 can be protected, so that it is preferable.

Furthermore, small projections 12*e* are formed on the rubber layer 12*b* covering the outer periphery radial direction part 11*c* in the attachment ring 11 from the atmosphere side, with specific intervals in the circumferential direction. Thus, in the case of keeping the sealing device 1, when they are piled up with the axial direction thereof being made vertical, the rubber layer 12 does not strongly contact with the seal flange 14*b* of the slinger 14, which is placed above (or under) the rubber layer 12*b*. Therefore, adhesion of these parts by being piled up for a long time can be effectively prevented.

Figure 4:
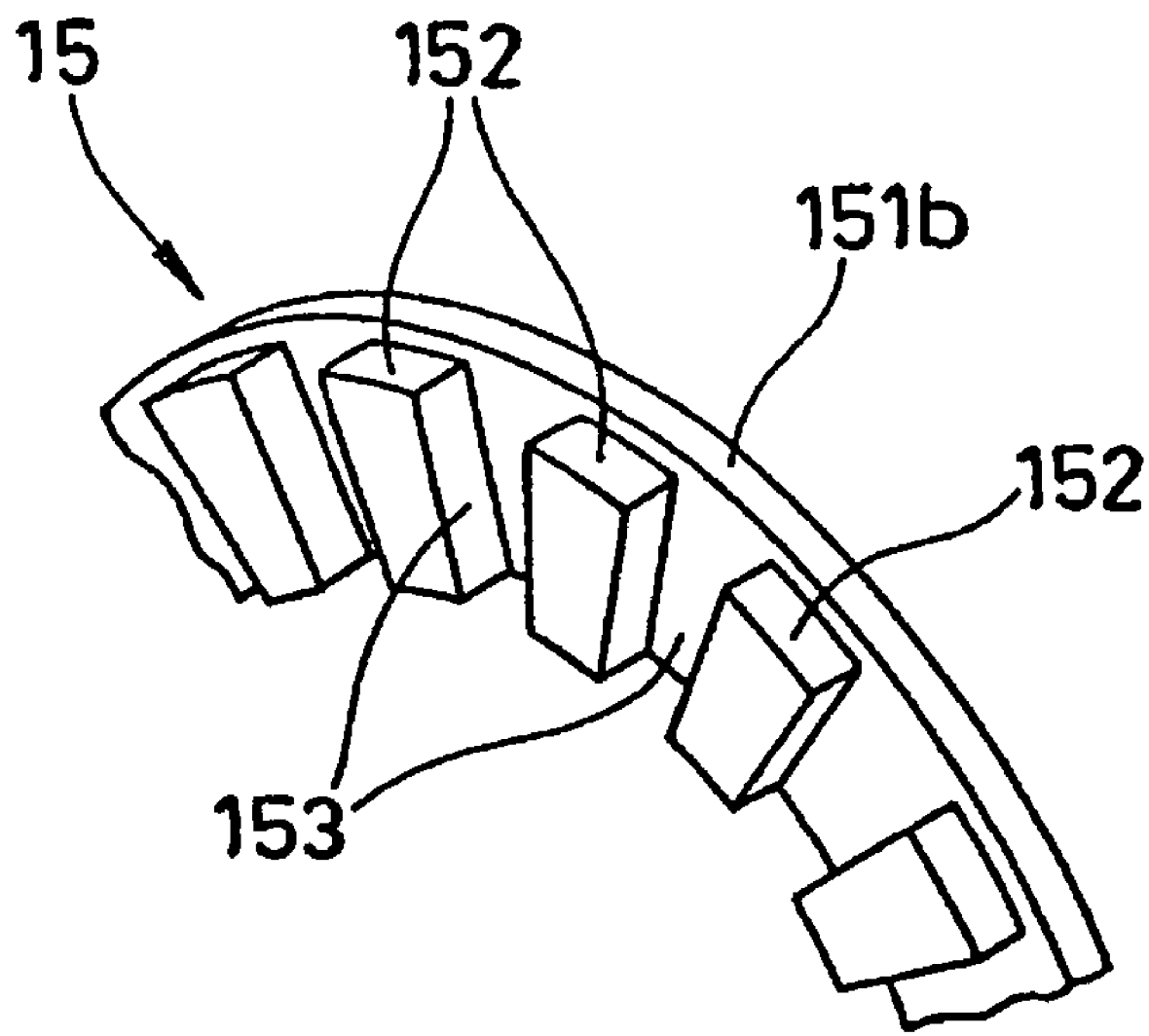
FIG. 4 is a partial perspective view illustrating another embodiment of a sealing device with a rotation detecting element according to the present invention.

In addition, in the above-described embodiment, the to-be-detected disc 15 has the disc shaped magnetized rubber disc 152 which is integrally provided to the flange 151*b* of the second slinger 151. However, it is not necessary that the magnetized rubber disc 152 is continuous in the circumferential direction. FIG. 4 is a partial perspective view illustrating an example, in which the magnetized rubber disc 152 is discontinuous in the circumferential direction, as another embodiment.

That is, in the embodiment in FIG. 4, many magnetized rubber discs 152 extended in the radial direction are adhered on the flange 151*b* of the second slinger 151, with regular intervals in the circumferential direction, and radial grooves 153, 153, - - - are formed between the magnetized rubber discs 152, 152, - - - -. Each magnetized rubber disc 152 is made of the rubber-like elastic material in which fine powders of a ferromagnetic metal such as ferrite or the like are uniformly mixed, and magnetized. These can be formed and adhered by vulcanizing at once on the second slinger 151.

Further, according to this embodiment, the following effects can be obtained in addition to the same effect as that of FIGS. 1 and 3. When the to-be-detected disc 15 is integrally rotated with the crank shaft 2, a remarkable centrifugal pumping operation occurs by the radial grooves 153, 153, - - - between the magnetized rubber discs 152, 152, - - - , so that entering of the foreign materials into the dust lip 13 side in FIG. 1 is prevented. Therefore, more excellent dust seal effect can be obtained. Further, the device has a cooling effect by air flowing toward the outer periphery side from the inner periphery side in the radial grooves 153, 153, - - - , so that sliding heat generation in the dust lip 13 or the like can be effectively removed.

Figure 5:
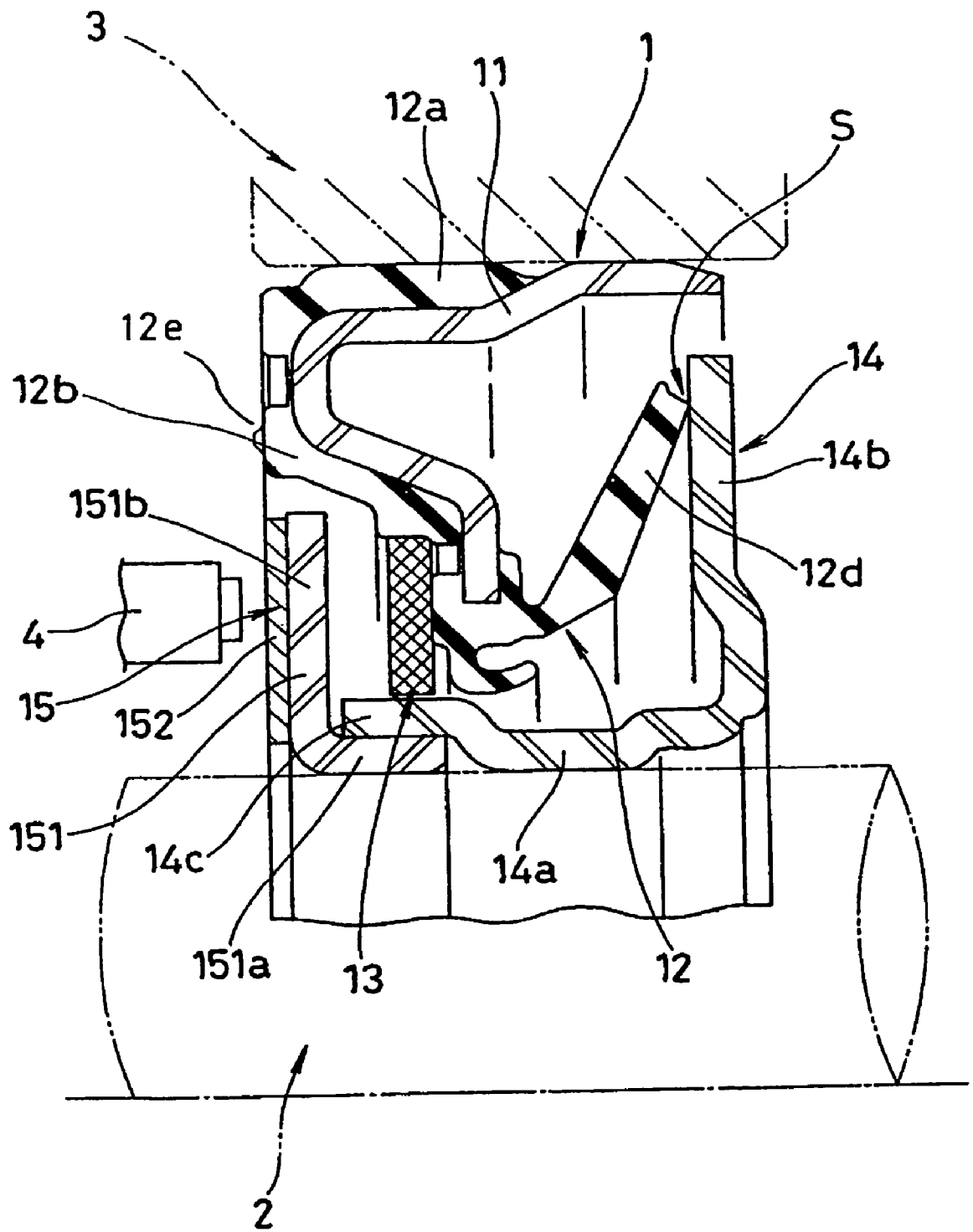
FIG. 5 is a half sectional view in a mounting state illustrating another embodiment of a sealing device with a rotation detecting element according to the present invention, where the device is cut at a plane passing the axis thereof.

Then, FIG. 5 is a half sectional view in a mounting state illustrating another embodiment of a sealing device with a rotation detecting element according to the present invention, where the device is cut at a plane passing an axis thereof. This embodiment has basically same constitution as that of FIG. 1, but the followings are different from FIG. 1. An enlarged diameter cylindrical part 14*c*, which is formed to have a larger diameter with an increment approximately corresponding to the thickness of the cylindrical fitting part 151*a* of the second slinger 151, is provided at the end part on the atmosphere side of the cylindrical fitting part 14*a* in the slinger 14. Further, the cylindrical fitting part 151*a* of the second slinger 151 is pressed and fitted into the inner peripheral surface of the enlarged diameter cylindrical part 14*c*.

According to this embodiment, the following effects can be obtained in addition to the same effects as those of FIGS. 1 and 3. The width in the radial direction of the flange 151*b* in the second slinger 151 can be enlarged with an increment corresponding to the thickness of the cylindrical fitting part 14*a* of the slinger 14 to the inner peripheral side. So, the area of the magnetized rubber disc 152 adhered on the flange 151*b* can be increased. As a result of this, the area to be detected (the magnetized area) of the magnetized rubber disc 152 is also increased, so that detecting accuracy can be enhanced. Further, when the inner peripheral surface of the cylindrical fitting part 151*a* of the second slinger 151 does tightly contact with the outer peripheral face of the crank shaft 2, mounting accuracy (concentricity) can be enhanced.

Further, even when the engine oil in the engine slightly enters into the sealing and sliding section S between the seal lip 12d of the seal ring 12 and the seal flange 14b of the slinger 14, the engine oil may not leak toward the atmosphere side since the outer peripheral surface of the cylindrical fitting part 14a of the slinger 14 does not have the fitting surface with the second slinger 151.

According to the present invention, even when fluid such as an engine oil is an object to seal, a sealing device with a rotation detecting element can detects rotation.

What is claimed is:

1. A sealing device with a rotation detecting element, wherein a crank shaft is rotatably supported in a cylinder block of an engine, a seal housing is secured to said cylinder block, a sealing element in said seal housing for sealing a boundary space between a crank chamber side of the engine and an external atmosphere side, and a detector in said cylinder block at the external atmosphere side for detecting a rotary condition of said crank shaft, said sealing device comprising:
    a seal ring secured to said seal housing and including a gasket part, an intermediate part, a base part, and a seal lip, said gasket part being secured to said seal housing, said base part extending from said gasket part through said intermediate part toward said crank shaft, and said seal lip being bent from said base part of said seal ring toward said seal housing at said crank chamber side;
    an attachment ring secured to said seal housing and including a cylindrical press-fit part, an intermediate part, and an inner peripheral radial part, said cylindrical press-fit part being adapted to secure said gasket part of said seal ring to said seal housing, said intermediate part being adapted to support said intermediate part of said seal ring, and said inner peripheral radial part being adapted to support said base part of said seal ring;
    a first slinger secured to said crank shaft and including a first cylindrical fitting part and a seal flange, said first cylindrical fitting part being secured to said crank shaft, said seal flange being bent from said first cylindrical fitting part toward said seal housing at said crank chamber side, a distal end of said seal lip being brought into contact with said seal flange to define a sealing and sliding section;
    a second slinger secured to said first slinger at said atmosphere side and including a second cylindrical fitting part and a flange, said second cylindrical fitting part being secured to said first cylindrical fitting part of said first slinger, said flange being bent from said second cylindrical fitting part toward said seal housing at said atmosphere side, and an inner peripheral surface of said base part of said seal ring being closely opposed to an outer peripheral surface of said second cylindrical fitting part of said second slinger with respect to a radial direction of said crank shaft;
    a to-be-detected disc secured to said flange of said second slinger at said atmosphere side and arranged to be opposed to said detector; and
    a dust lip secured to said base part of said seal ring at said atmosphere side, and an inner peripheral surface of said dust lip being closely opposed to an outer peripheral surface of said second cylindrical fitting part of said second slinger with respect to a radial direction of said crank shaft;
    a slight gap located between an inner peripheral surface of said intermediate part of said seal ring and an outer peripheral surface of said flange of said second slinger at said atmosphere side.

2. The sealing device with a rotation detecting element according to claim 1, wherein said seal flange of said first slinger is provided on a surface at the sealing and sliding section side with a spiral screw.

3. The sealing device with a rotation detecting element according to claim 1, wherein said first cylindrical fitting part of said first slinger is provided with an enlarged diameter cylindrical part at said atmosphere side and said second cylindrical fitting part of said second slinger is press-fitted into a space between an inner peripheral surface of said enlarged diameter cylindrical part and an outer peripheral surface of said crank shaft.

4. The sealing device with a rotation detecting element according to claim 1, wherein said detector is a magnetic sensor and said to-be-detected disc is a magnetized rubber disc.

5. The sealing device with a rotation detecting element according to claim 4, wherein said magnetized rubber disc is provided with a plurality of radial grooves.

* * * * *